G. A. HOWE.
JOURNAL BEARING.
APPLICATION FILED AUG. 2, 1917.

1,254,909.

Patented Jan. 29, 1918.

WITNESSES

INVENTOR
George A. Howe

UNITED STATES PATENT OFFICE.

GEORGE A. HOWE, OF PITTSBURGH, PENNSYLVANIA.

JOURNAL-BEARING.

1,254,909. Specification of Letters Patent. Patented Jan. 29, 1918.

Application filed August 2, 1917. Serial No. 184,140.

*To all whom it may concern:*

Be it known that I, GEORGE A. HOWE, a resident of Pittsburgh, in the county of Allegheny and State of Pennsylvania, have invented a new and useful Improvement in Journal-Bearings, of which the following is a specification.

This invention relates to bearings for journals.

An object of the invention is to provide a bearing in which the load will be distributed to more than one contact between journal and axle. A further object is to provide such a bearing constructed so that the load on the bearing will be carried by a plurality of plane bearing surfaces, rather than on a cylindrical surface. A further object is to provide oil-retaining recesses at the angles of the bearing planes in order that the journal may be in contact with an oil bath at a plurality of points about its circumference, and to trap this oil under pressure, while preventing escape thereof from the ends of the bearing. A further object is to provide by means of a polygonal bearing made of two or more parts, means to take up the wear of the bearing faces, and to bring different sets of these faces into the position of maximum wear by rotary adjustment of the bearing. These and other objects will be more fully set forth in the following specification.

Figure 1:
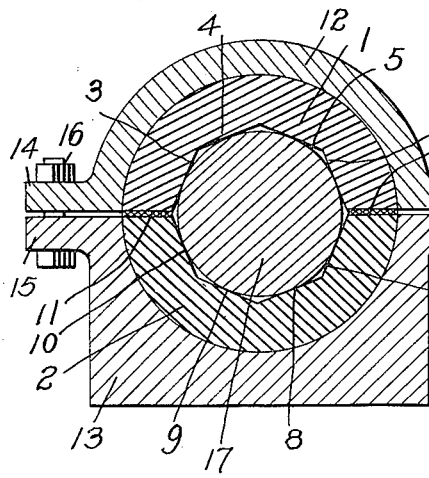
Figure 2:
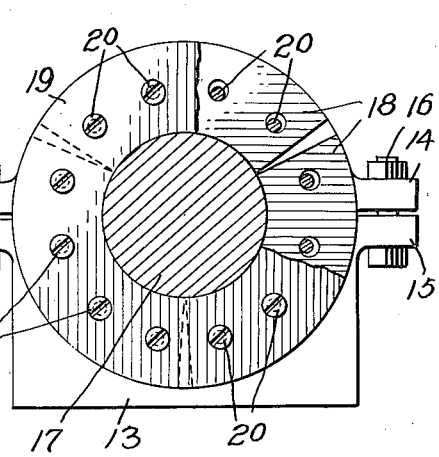
Figure 3:
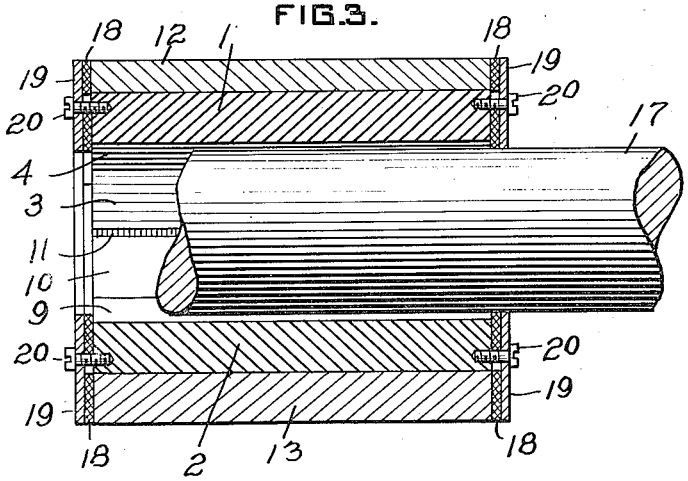

Figure 1 is a vertical cross section through the bearing and the journal therein, and a housing for the bearing; Fig. 2 is a journal section and end elevation of the bearing, with parts broken away; Fig. 3 is a transverse vertical section through the bearing and its housing, with a portion of a journal in position therein.

The ordinary journal bearing is cylindrical, and slightly larger in diameter than the journal adapted to turn therein. If both journal and bearing are accurate in shape, the contact therebetween will be a line at the bottom or top of the bearing, according to the load suspension. This results in putting the entire load on a single weight-carrying line of contact, resulting in a tendency to wear and shear the bearing metal rapidly at that particular point, and, because of the undistributed load, it is hard to maintain a film of oil between the wearing surfaces along the line of contact.

Friction between bearing surfaces varies as the load carried. The purpose of lubrication is to prevent any metal contact between the bearing surfaces, by interposing an unbroken film of oil. The thicker this oil film is, the less will be the friction and resistance to motion of the parts. The oil film is thinned by pressure or load, but also it is thickened by having the oil itself trapped so as to be under pressure. These well known physical laws are recognized in the construction of an embodiment of my invention.

The present invention comprises a bearing having a polygonal form in cross section, forming a plurality of plane bearing surfaces. Preferably a regular octagon is used, as shown in Fig. 1, and the bearing is made up of an upper part 1 and a lower part 2, each having four faces, which in the drawing are numbered 3 to 10, respectively. The two sections, designed to form a complete bearing, are cut so that the adjoining sides are slightly shorter than the complete sides of the regular octagon, so that a packing member 11 may be placed between the sections to fill up the space which would otherwise be left by the short sides. This space left for packing also furnishes means for adjustment, so that the bearing may be tightened or loosened, to take up wear, and also to allow for slight irregularities of machining in the journal or the bearing.

The outer faces of the two sections forming the bearing are preferably cylindrical, so that the bearing when held by a circular housing may be rotated in place, to bring any desired faces of the bearing into the position of maximum wear.

As seen in this drawing, the housing is circular, formed of an upper member 12 and a lower member 13 having coöperating flanges 14 and 15, respectively, adapted to be held together, by bolts 16, and so to hold the bearing in place and to compress the packing 11 to furnish the desired adjustment on the journal 17.

It is desirable to have an oil bath located in the bearing, and for this purpose I provide at each end of the bearing a packing 18, adapted to be clamped against the end of the bearing and its housing by a metal ring 19, retained by screws 20 adapted to pass through the ring and packing member and threaded into the bearing members, or their housing. Preferably this packing member is made in sections, as shown in Fig. 2, with the holes therethrough for retaining screws 20, made larger than the screws, so that as the packing wears by contact with journal 17, this wear may be taken up by loosening the bolts 20 and driving the packing inward against the journal, as will be obvious. This effectually incloses the bearing at each end, and permits the spaces provided by the corners of the polygonal bearing to be kept full of oil, thus insuring constant lubrication, and holding it under pressure, as will be obvious.
By loosening bolts 16 and consequently the engagement of the housing of the bearing, the latter may be rotated through any desired number of degrees, to bring different faces thereof into the maximum wearing position. Any four consecutive plane faces may thus be used as the wearing faces.

While other shapes may be used, such as hexagonal, there are a great many advantages to the octagonal shaped bearing. For instance, as shown, the load is distributed to four points, the journal 17 bearing against faces 7, 8, 9 and 10, distributing the load to these faces, and distributing the frictional engagement to four points. This will follow, even though there should be some slight inaccuracy of machining of the bearing, because should only two of the points of support be in contact, these will tend to wear down, and this will result in bringing the journal into contact with all of the four lower faces of the octagonal bearing.

The effect of distributing the load to four lines instead of one is to lessen the pressure on the contact point, resulting in a much thicker film at the four bearing points than in the case of one such point. This reduces wear, and results in much less friction as a whole. The trapping of oil between the bearing points also tends to hold it under pressure, and this increases the thickness of the oil film beyond the trapped bath.

Another advantage is that because of the decreased load, lessened friction, and thicker oil film, I may use a journal of the same metal as the bearing, without the necessity of a forced oil bath as is now the case where journal and bearing under considerable pressure are of the same metal.

Another important advantage of the form of bearing is that the metal forced or sheared out of place by the journal at the load points, passes into the angle between planes, where it has no effect on the bearing.

Of course it will be understood that although I have shown one particular form of housing for the bearing, this is not intended to be exclusive, or anything more than an illustration and the bearing may be used in any desired form of mounting, and may either rotate around the shaft, as in an automobile axle, or carry a rotating journal, as in a car wheel of ordinary car construction, and as illustrated.

What I claim is:—

1. A journal bearing comprising two transverse sections adapted to be fitted together, and having the interior surfaces cut away to form a polygon in cross section.

2. A polygonal journal bearing comprising two transverse sections adapted to be fitted together, a packing between the sections, and means to hold the sections in proper relative position.

3. An octagonal journal bearing comprising two transverse sections adapted to be fitted together, and means to hold them in relative position.

4. A journal bearing having its surface cut to form a regular polygon, comprising two transverse sections, and means at each end of the bearing to retain a lubricant therein.

5. A journal bearing having its surface cut to form a regular octagon, and means at each end of the bearing to retain a lubricant therein.

6. A journal bearing comprising two sections cut on their inside to form an octagonal bearing, a packing between the sections, and a housing adapted to retain the sections in relative position on the journal.

7. A journal bearing comprising two sections cut on their inside to form an octagonal bearing, a packing between the sections, a housing adapted to retain the sections in relative position on the journal, and means at each end of the bearing to retain a lubricant therein.

8. A journal bearing comprising two sections having their interior faces cut away to form an octagonal bearing for a cylindrical journal, the outsides of the sections being cylindrical, a packing adapted to fit between the edges of the sections, a circular housing adapted to hold the bearing in position, and means to adjust the fitting of the housing on the bearing.

9. A bearing for a cylindrical journal having a plurality of plane bearing surfaces, said bearing being composed of two transverse sections, a two-part casing inclosing the bearing sections, and means to adjust the fit of the two sections on the journal by varying the pressure of the casing on the bearing members.

10. A bearing for cylindrical journals, comprising two sections having a plurality of plane bearing surfaces, and a packing member at each end of the bearing to retain a lubricant therein.

11. A bearing for cylindrical journals comprising two transverse sections having a plurality of plane bearing surfaces, a housing for said bearing, and means for rotating the bearing in the housing to bring different bearing planes into load-carrying position.

12. A bearing for cylindrical journals, comprising two transverse sections having a plurality of plane bearing surfaces, and means to trap a lubricant in the angles between the bearing surfaces.

In testimony whereof, I have hereunto set my hand.

GEORGE A. HOWE.

Witness:
G. H. LERESCHE.